US012100978B2

(12) United States Patent
Marchais et al.

(10) Patent No.: US 12,100,978 B2
(45) Date of Patent: Sep. 24, 2024

(54) CONFIGURABLE NETWORK FOR ENABLING EFFICIENT CHARGING AND LOADING OF TWO BATTERY CELLS

(71) Applicant: Cirrus Logic International Semiconductor Ltd., Edinburgh (GB)

(72) Inventors: Emmanuel A. Marchais, Dripping Springs, TX (US); James M. Nohrden, Austin, TX (US); John L. Melanson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 409 days.

(21) Appl. No.: 17/466,478

(22) Filed: Sep. 3, 2021

(65) Prior Publication Data

US 2022/0224127 A1 Jul. 14, 2022

Related U.S. Application Data

(60) Provisional application No. 63/135,258, filed on Jan. 8, 2021.

(51) Int. Cl.
*H02J 7/00* (2006.01)
(52) U.S. Cl.
CPC .......... *H02J 7/0024* (2013.01); *H02J 7/0019* (2013.01); *H02J 2310/22* (2020.01)
(58) Field of Classification Search
USPC ......................................................... 320/137
See application file for complete search history.

(56) References Cited

U.S. PATENT DOCUMENTS

| 5,568,038 | A | * | 10/1996 | Tatsumi | ................... | H02J 9/061 |
| | | | | | | 320/164 |
| 2005/0189922 | A1 | * | 9/2005 | Maskatia | ............... | G06F 1/1616 |
| | | | | | | 320/138 |
| 2018/0001850 | A1 | * | 1/2018 | Kontani | ..................... | H02J 1/08 |
| 2018/0069428 | A1 | * | 3/2018 | Hsieh | ..................... | H02J 7/0068 |
| 2019/0126761 | A1 | * | 5/2019 | Verbridge | ............... | B60L 53/11 |
| 2020/0185936 | A1 | * | 6/2020 | Oishi | ..................... | H02J 7/0024 |
| 2021/0305837 | A1 | * | 9/2021 | Hung | .................. | H01M 10/441 |

\* cited by examiner

*Primary Examiner* — Samuel Berhanu
(74) *Attorney, Agent, or Firm* — Jackson Walker L.L.P.

(57) ABSTRACT

A two-cell battery management system may include a switching network comprising a plurality of switches configured to electrically couple two battery cells to one another and a first load configured to receive electrical energy from the two battery cells and control circuitry configured to dynamically control the switching network among a plurality of switching configurations comprising a first switching configuration in which the first load is in parallel with both of the two battery cells, a second switching configuration in which the first load is in parallel with a first battery cell of the two battery cells and is electrically isolated from a second battery cell of the two battery cells, and a third switching configuration in which the first load is in parallel with the second battery cell and is electrically isolated from the first battery cell.

17 Claims, 12 Drawing Sheets

CONFIGURABLE NETWORK FOR ENABLING EFFICIENT CHARGING AND LOADING OF TWO BATTERY CELLS

RELATED APPLICATION

The present disclosure claims priority to U.S. Provisional Patent Application Ser. No. 63/135,258 filed Jan. 8, 2021, which is incorporated by reference herein in its entirety.

FIELD OF DISCLOSURE

The present disclosure relates in general to circuits for electronic devices, including without limitation personal audio devices such as wireless telephones and media players, and more specifically, a configurable network for enabling efficient charging and loading of two battery cells.

BACKGROUND

Portable electronic devices, including wireless telephones, such as mobile/cellular telephones, tablets, cordless telephones, mp3 players, smart watches, health monitors, and other consumer devices, are in widespread use. Such a portable electronic device may include one or more rechargeable battery cells for powering components of the portable electronic device. For example, the use of two series-coupled cells is common in portable electronic devices.

Using an existing charging and battery loading architecture for two cells, a switching network may direct-charge two series-coupled cells to avoid charger integrated circuit losses that may limit fast charging. In such an architecture, a low-voltage load may be coupled via a 2:1 step-down charge pump that may incur switching losses, and reduce battery life. In addition, a portion of the load may require higher voltage and thus may incur further boosting losses due to a boost converter for stepping up voltage from that needed for the low-voltage load to that needed for the higher-voltage load. Further, a cell balancing circuit may be required when using the existing architecture.

SUMMARY

In accordance with the teachings of the present disclosure, one or more disadvantages and problems associated with existing approaches to battery charging and loading architectures may be reduced or eliminated.

In accordance with embodiments of the present disclosure, a two-cell battery management system may include a switching network comprising a plurality of switches configured to electrically couple two battery cells to one another and a first load configured to receive electrical energy from the two battery cells and control circuitry configured to dynamically control the switching network among a plurality of switching configurations comprising a first switching configuration in which the first load is in parallel with both of the two battery cells, a second switching configuration in which the first load is in parallel with a first battery cell of the two battery cells and is electrically isolated from a second battery cell of the two battery cells, and a third switching configuration in which the first load is in parallel with the second battery cell and is electrically isolated from the first battery cell.

In accordance with these and other embodiments of the present disclosure, a method for managing a system having two battery cells may include dynamically controlling a switching network comprising a plurality of switches configured to electrically couple the two battery cells to one another and a first load configured to receive electrical energy from the two battery cells, wherein dynamic controlling comprises controlling the switching network among a plurality of switching configurations comprising a first switching configuration in which the first load is in parallel with both of the two battery cells, a second switching configuration in which the first load is in parallel with a first battery cell of the two battery cells and is electrically isolated from a second battery cell of the two battery cells, and a third switching configuration in which the first load is in parallel with the second battery cell and is electrically isolated from the first battery cell.

In accordance with these and other embodiments of the present disclosure, a portable electronic device may include two battery cells and a two-cell battery management system comprising a switching network comprising a plurality of switches configured to electrically couple the two battery cells to one another and a first load configured to receive electrical energy from the two battery cells and control circuitry configured to dynamically control the switching network among a plurality of switching configurations. The plurality of switching configurations may include a first switching configuration in which the first load is in parallel with both of the two battery cells, a second switching configuration in which the first load is in parallel with a first battery cell of the two battery cells and is electrically isolated from a second battery cell of the two battery cells, and a third switching configuration in which the first load is in parallel with the second battery cell and is electrically isolated from the first battery cell.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
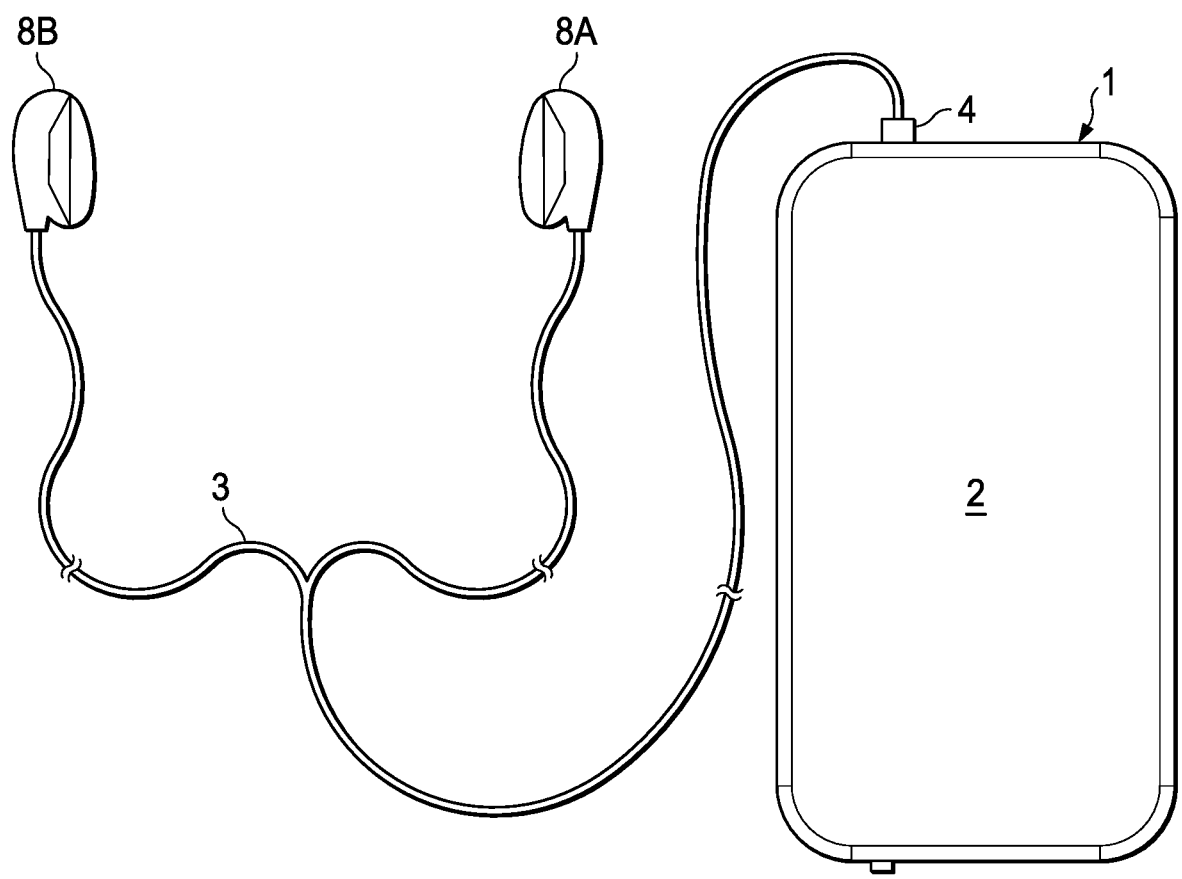
FIG. 1 illustrates an example portable electronic device, in accordance with embodiments of the present disclosure.

FIG. 1 illustrates an example portable electronic device 1, in accordance with embodiments of the present disclosure. FIG. 1 depicts portable electronic device 1 coupled to a headset 3 in the form of a pair of earbud speakers 8A and 8B. Headset 3 depicted in FIG. 1 is merely an example, and it is understood that portable electronic device 1 may be used in connection with a variety of audio transducers, including without limitation, headphones, earbuds, in-ear earphones, and external speakers. A plug 4 may provide for connection of headset 3 to an electrical terminal of portable electronic device 1. Portable electronic device 1 may provide a display to a user and receive user input using a touch screen 2, or alternatively, a standard liquid crystal display (LCD) may be combined with various buttons, sliders, and/or dials disposed on the face and/or sides of portable electronic device 1.

Figure 2:
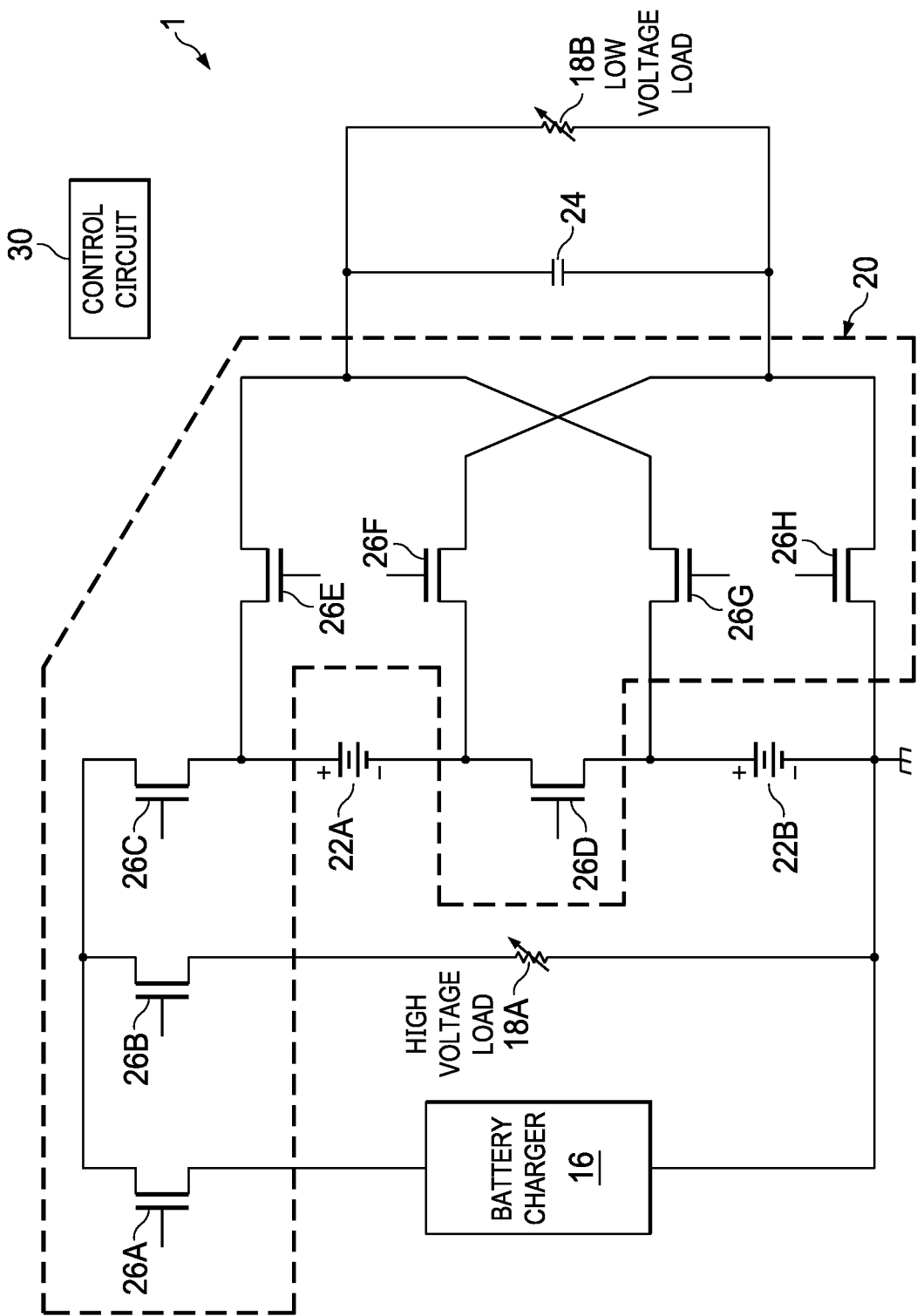
FIG. 2 illustrates a circuit diagram of selected components of a portable electronic device, in accordance with embodiments of the present disclosure.

FIG. 2 illustrates a block diagram of selected components of a portable electronic device 1, in accordance with embodiments of the present disclosure. As shown in FIG. 2, portable electronic device 1 may include a battery charger 16, at least two battery cells 22 (e.g., battery cells 22A and 22B), a high-voltage load 18A comprising one or more downstream components, a low-voltage load 18B comprising one or more downstream components, and a capacitor 24 coupled in parallel with low-voltage load 18B, and a switching network 20, wherein switching network 20 comprises a plurality of switches 26 (e.g., switches 26A, 26B, 26C, 26D, 26E, 26F, 26G, and 26H), all arranged as shown in FIG. 2. Further, portable electronic device 1 may include a control circuit 30 configured to control switches 26 (although connectivity for control signals communicated to control inputs of switches 26 are not depicted for purposes of clarity and exposition).

Battery charger 16 may include any system, device, or apparatus configured to charge a battery, for example by delivering electrical energy to a battery in order that such battery converts the electrical energy to chemical energy that is stored in such battery. In some embodiments, battery charger 16 may include a wired charger configured to draw electrical energy from an electrical power outlet or from a power bank. In other embodiments, battery charger 16 may include a wireless charger configured to draw electrical energy via inductive coupling from a wireless charging pad or similar device. In some embodiments, a portable electronic device 1 may include both a wired charger and a wireless charger. While FIG. 2 (and other FIGURES) depict battery charger 16 integral to portable electronic device 1, in some embodiments, all or a portion of battery charger 16 may be external to portable electronic device 1.

Each battery cell 22 may include any system, device, or apparatus configured to convert chemical energy stored within such battery cell 22 to electrical energy for powering downstream components (e.g., of high-voltage load 18A and low-voltage load 18B) of portable electronic device 1. Further, each battery cell 22 may also be configured to recharge, in which it may convert electrical energy received by such battery cell 22 into chemical energy to be stored for later conversion back into electrical energy. For example, in some embodiments, a battery cell 22 may comprise a lithium-ion cell.

Downstream components of high-voltage load 18A and low-voltage load 18B may include any suitable functional circuits or devices of portable electronic device 1, including without limitation processors, audio coder/decoders, amplifiers, display devices, etc. As their names imply, high-voltage load 18A may include downstream components requiring a higher voltage and/or higher power than those downstream components of low-voltage load 18B.

As shown in FIG. 2, switch 26A may be coupled between battery charger 16 and a high-voltage rail. Switch 26B may be coupled between high-voltage load 18A and the high-voltage rail. Switch 26C may be coupled between a cathode of battery cell 22A and the high-voltage rail. Switch 26D may be coupled between an anode of battery cell 22A and a cathode of battery cell 22B. Accordingly, when switches 26A, 26B, 26C, and 26D are all activated (e.g., on, enabled, closed), battery charger 16, high-voltage load 18A, and the series combination of battery cells 22 may be coupled in series between the high-voltage rail and a ground rail.

As shown in FIG. 2, switch 26E may be coupled between the cathode of battery cell 22A and a first terminal of low-voltage load 18B. Switch 26F may be coupled between the anode of battery cell 22A and a second terminal of low-voltage load 18B. Switch 26G may be coupled between the cathode of battery cell 22B and the first terminal of low-voltage load 18B. Switch 26H may be coupled between the anode of battery cell 22B and the second terminal of low-voltage load 18B.

As described in more detail below, control circuit 30 may control switches 26 of switching network 20 to dynamically configure coupling among battery cells 22, battery charger 16, high-voltage load 18A, and low-voltage load 18B, in order to minimize losses and simplify design as compared to existing approaches.

Figure 3A:
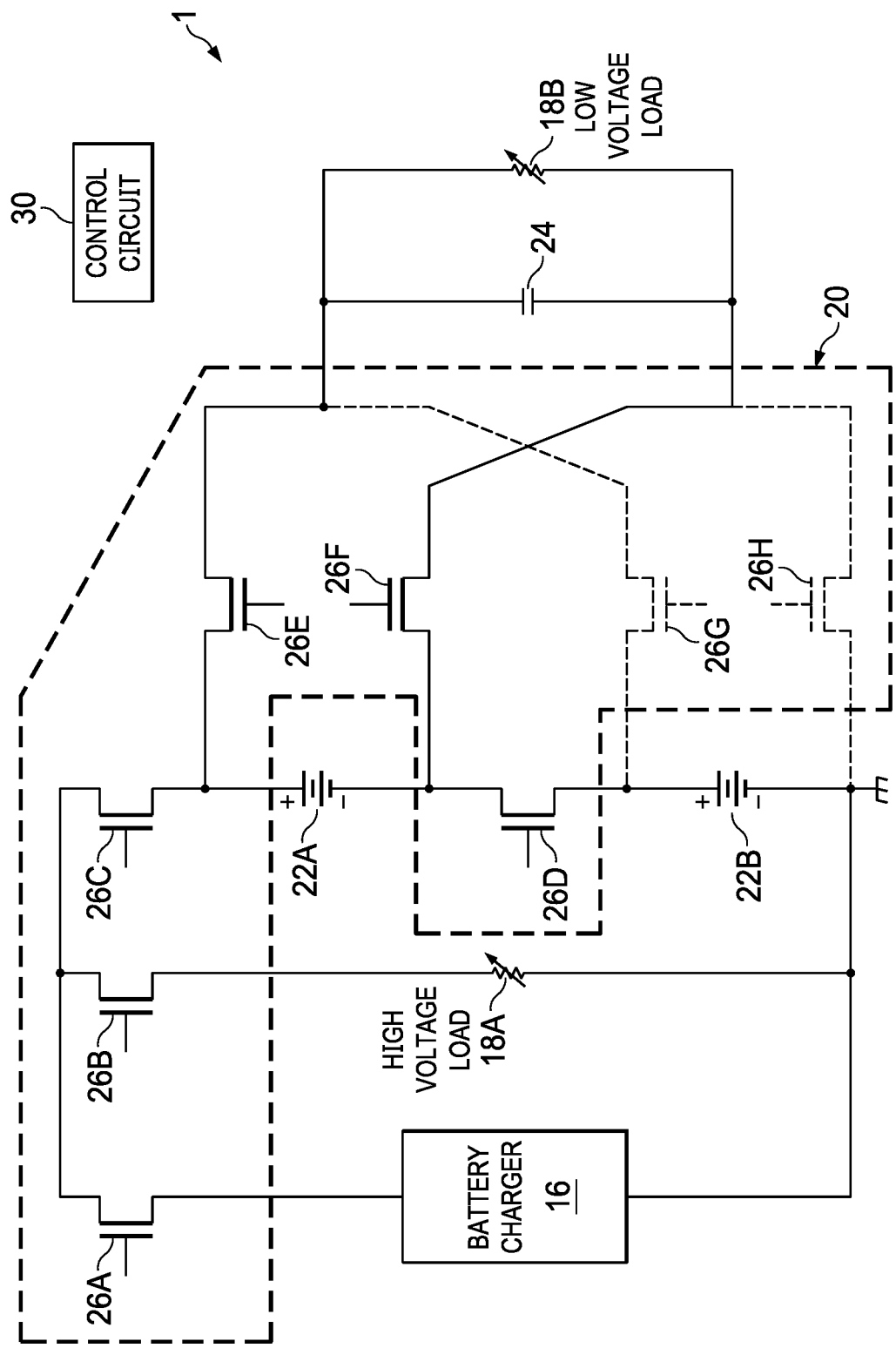
FIGS. 3A and 3B illustrate two alternating phases of operation of a first mode of a switching network with a battery charger present and current being drawn by both the high-voltage load and the low-voltage load of the portable electronic device of FIGS. 1 and 2, in accordance with embodiments of the present disclosure.
Figure 3B:
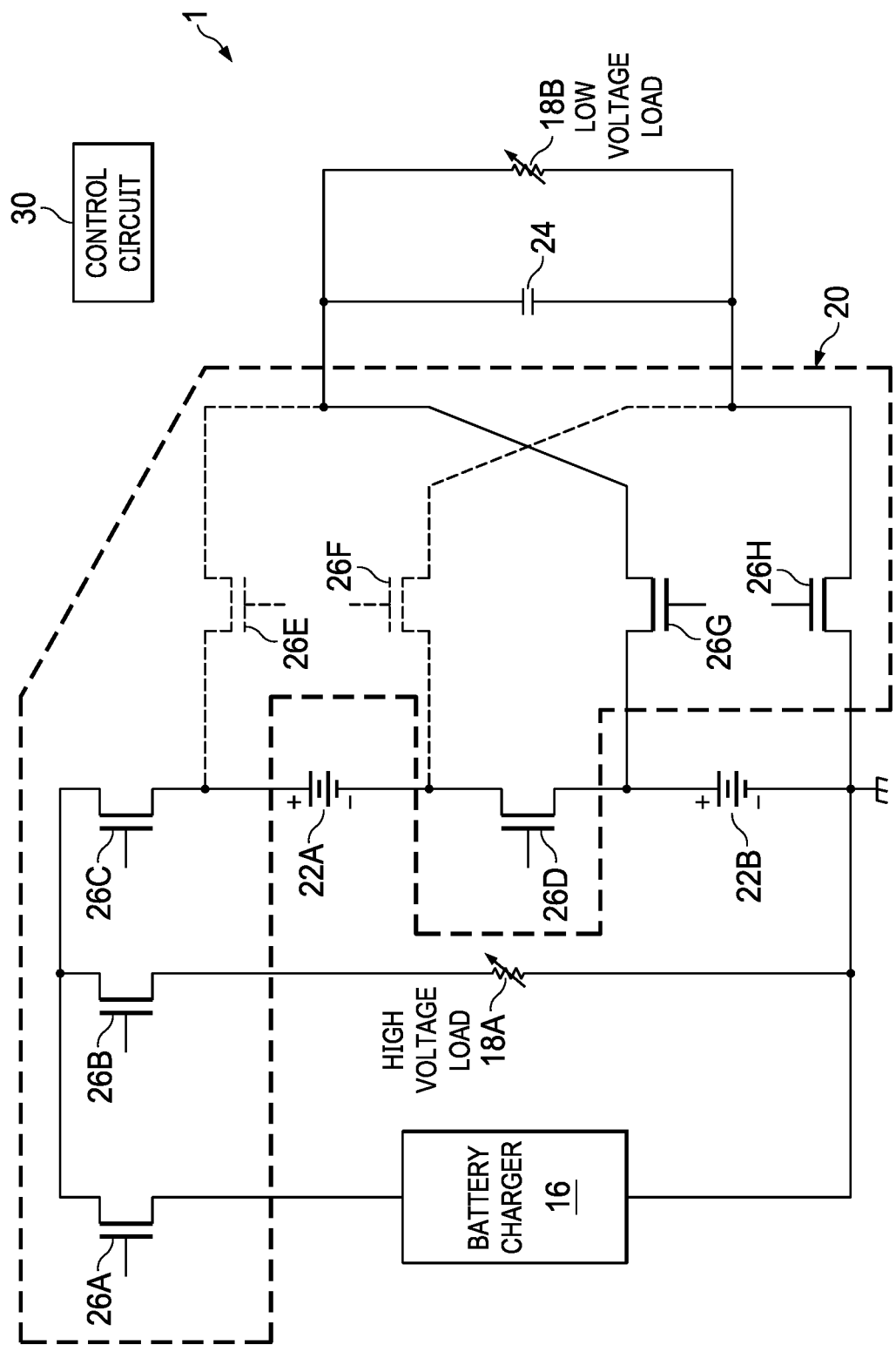

FIGS. 3A and 3B illustrate two alternating phases of a first mode of operation of switching network 20 with battery charger 16 present and current being drawn by both high-voltage load 18A and low-voltage load 18B, in accordance with embodiments of the present disclosure. In both phases of the first mode, control circuit 30 may cause switches 26A, 26B, 26C and 26D to activate, such that high-voltage load 18A and battery charger 16 are coupled to the series combination of both battery cells 22. Little or no power conversion losses may be incurred in delivering electrical energy from battery cells 22 to high-voltage load 18A. On the other hand, during a first phase of the first mode, as shown in FIG. 3A, control circuit 30 may cause switches 26E and 26F to activate, and switches 26G and 26H to deactivate (e.g., turn off, become disabled, open). Similarly, during a second phase of the first mode, as shown in FIG. 3B, control circuit 30 may cause switches 26E and 26F to deactivate, and switches 26G and 26H to activate. Thus, during the first mode, low-voltage load 18B may be alternately coupled to battery cell 22A during the first phase and to battery cell 22B in the second phase.

In effect, switches 26E, 26F, 26G, and 26H may replace switches of a step-down charge pump that may be present in traditional architectures. In the architecture shown in FIGS. 3A and 3B, battery cells 22 may effectively act as fly capacitors. Because the equivalent capacitance of a battery cell 22 may be much larger than capacitance of physical capacitors traditionally used as fly capacitors, switching frequency may be reduced as compared to traditional architectures, leading to minimal switching losses. Further, the alternative coupling of low-voltage load 18B between battery cell 22A and 22B may automatically balance battery cells 22, avoiding the need for cell balancing circuitry typically required in traditional architectures.

Figure 4A:
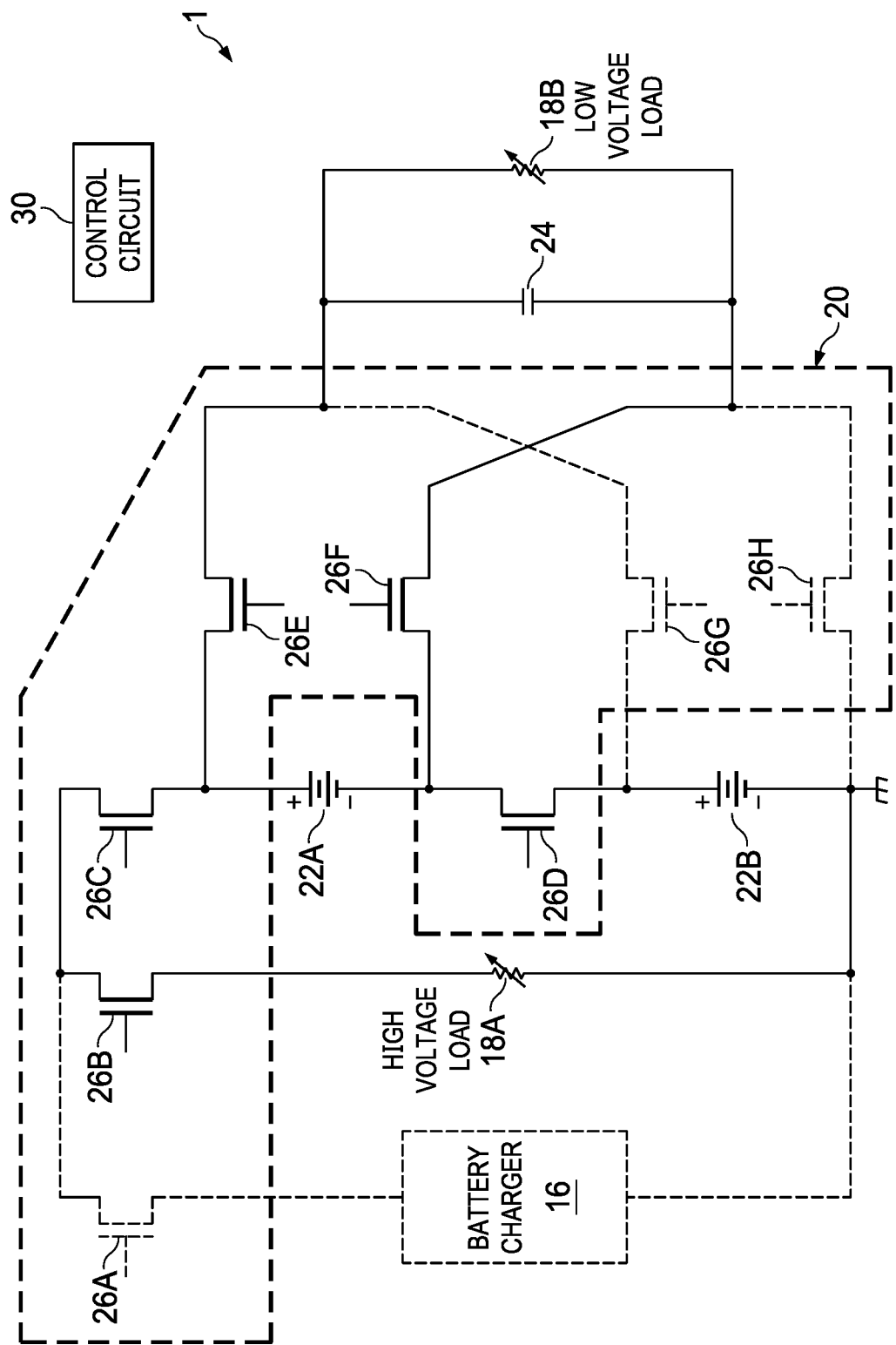
FIGS. 4A and 4B illustrate two alternating phases of operation of a second mode of a switching network with a battery charger absent and current being drawn by both the high-voltage load and the low-voltage load of the portable electronic device of FIGS. 1 and 2, in accordance with embodiments of the present disclosure.
Figure 4B:
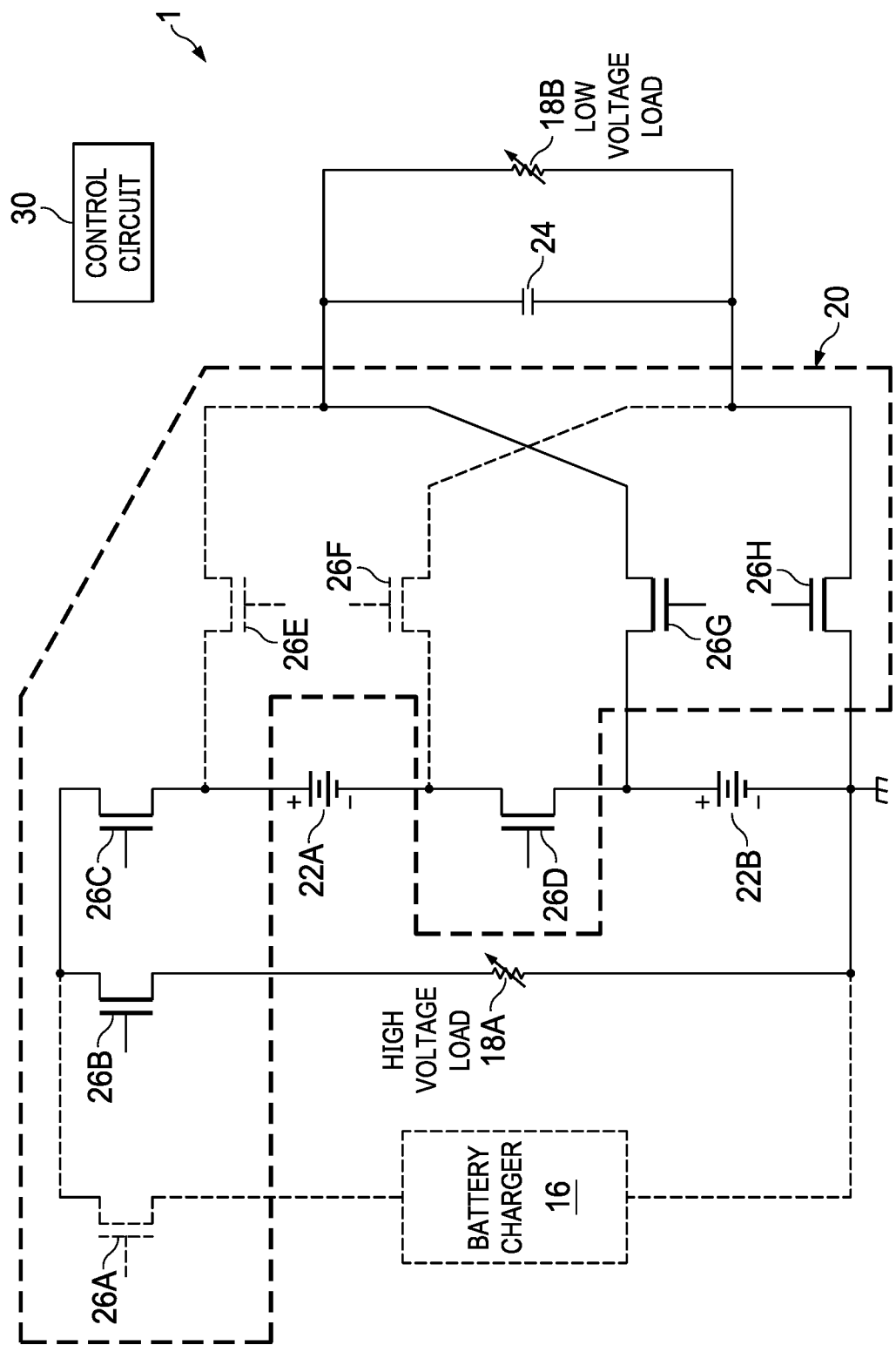

FIGS. 4A and 4B illustrate two alternating phases of a second mode of operation of switching network 20 with battery charger 16 absent and current being drawn by both high-voltage load 18A and low-voltage load 18B, in accordance with embodiments of the present disclosure. By "absent," it is intended to mean battery charger 16 is inactive (e.g., not plugged in to a source of electrical energy) or otherwise decoupled from the remainder of portable electronic device 1 (e.g., by way of deactivation of switch 26A).

In both phases of the second mode, control circuit 30 may cause switches 26B, 26C and 26D to activate, such that high-voltage load 18A is coupled to a series combination of both battery cells 22. Little or no power conversion losses may be incurred in delivering electrical energy from battery cells 22 to high-voltage load 18A. On the other hand, during a first phase of the second mode, as shown in FIG. 4A, control circuit 30 may cause switches 26E and 26F to activate, and switches 26G and 26H to deactivate. Similarly, during a second phase of the second mode, as shown in FIG. 4B, control circuit 30 may cause switches 26E and 26F to deactivate, and switches 26G and 26H to activate. Thus, during the second mode, low-voltage load 18B may be alternately coupled to battery cell 22A during the first phase and to battery cell 22B in the second phase.

Figure 5:
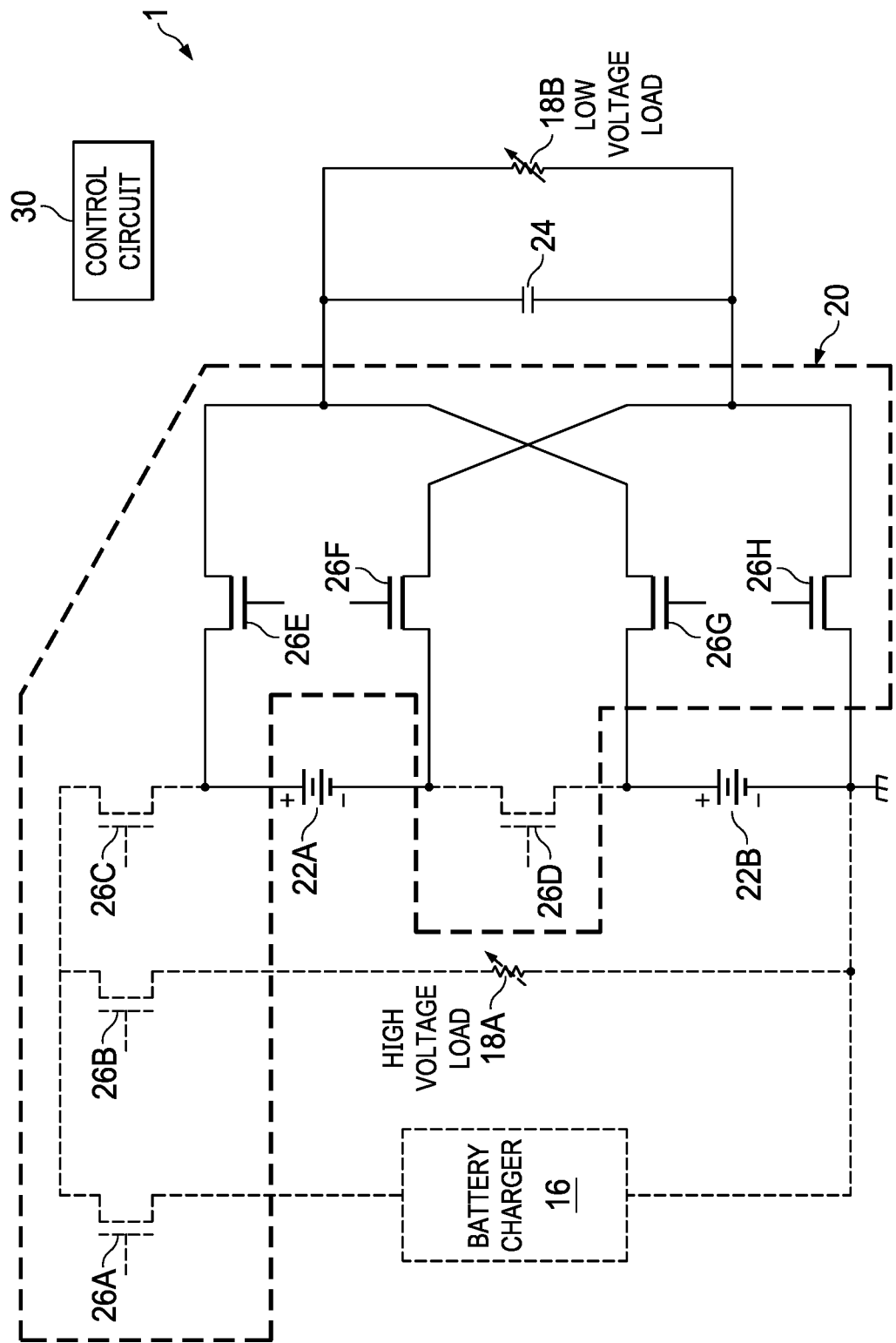
FIG. 5 illustrates operation of a third mode of a switching network with a battery charger absent and current being drawn by the low-voltage load, but not the high-voltage load, of the portable electronic device of FIGS. 1 and 2, in accordance with embodiments of the present disclosure.

In some instances, high-voltage load 18A may not draw current (e.g., when no audio is played back from portable electronic device 1). In such instances, switching network 20 may operate in a third mode of operation. FIG. 5 illustrates a third mode of operation of switching network 20 with battery charger 16 absent and current being drawn by low-voltage load 18B but not by high-voltage load 18A, in accordance with embodiments of the present disclosure. In the third mode, control circuit 30 may cause switches 26A, 26B, 26C and 26D to deactivate, and cause switches 26E, 26F, 26G, and 26H to activate, thus placing battery cell 22A and battery cell 22B in parallel with one another (and both battery cells 22 in parallel with low-voltage load 18B). In the switch configuration of the third mode, no switching may occur, and thus switching losses may be reduced to zero.

In the systems and methods described above with respect to FIGS. 3A through 5, a two-cell battery management system is disclosed. Such system may include at least a first load (e.g., low-voltage load 18B), and a switching network (e.g. switching network 20 of switches 26) coupling the first load to the two battery cells (e.g., battery cells 22). In a first configuration of the switching network, the switching network may couple the first load to the two battery cells in parallel (e.g., FIG. 5). In a second configuration of the switching network, the switching network may couple the first load in parallel with the first battery cell and isolate the first load from the second battery cell (see FIG. 4A). In a third configuration of the switching network, the switching network may couple the first load in parallel with the second battery cell and isolate the first load from the first battery cell (e.g., FIG. 4B). In some embodiments, the two-cell battery management system may further include a second load (e.g., high-voltage load 18A), with the switching network coupling the second load to the battery cells. In a fourth configuration of the switching network, the switching network may couple the second load in parallel to the series combination of the first battery cell and the second battery cell (e.g., FIGS. 3A and 3B).

In some instances, portable electronic device 1 may need to support a legacy charger having a lower output voltage (e.g., 4.5 volts) than that of battery charger 16 (e.g., 9 volts).

Figure 6A:
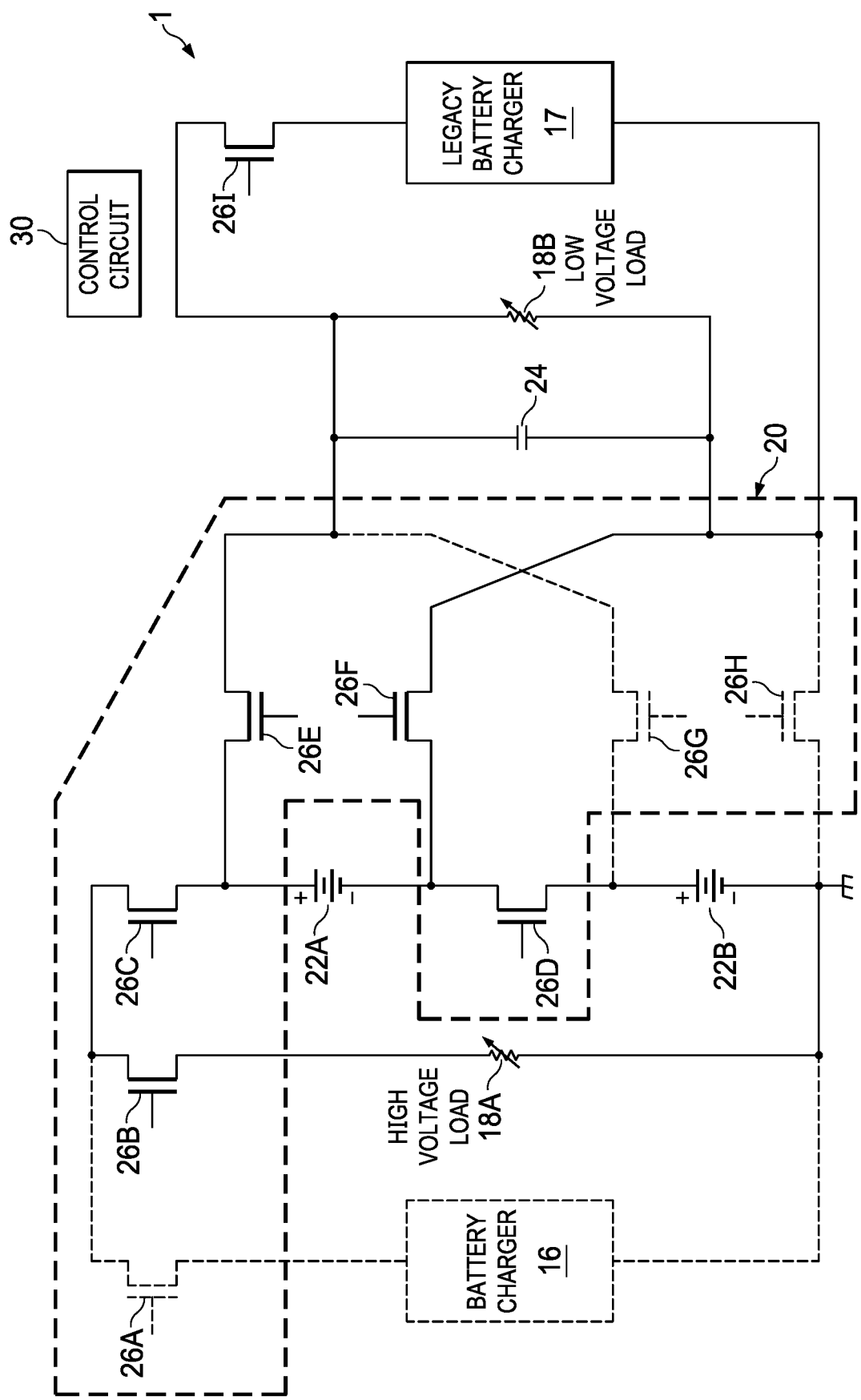
FIGS. 6A and 6B illustrate two alternating phases of operation of a fourth mode of a switching network with a legacy battery charger present in parallel with the low-voltage load of the portable electronic device of FIGS. 1 and 2 and current being drawn by both the high-voltage load and the low-voltage load of the portable electronic device of FIGS. 1 and 2, in accordance with embodiments of the present disclosure.
Figure 6B:
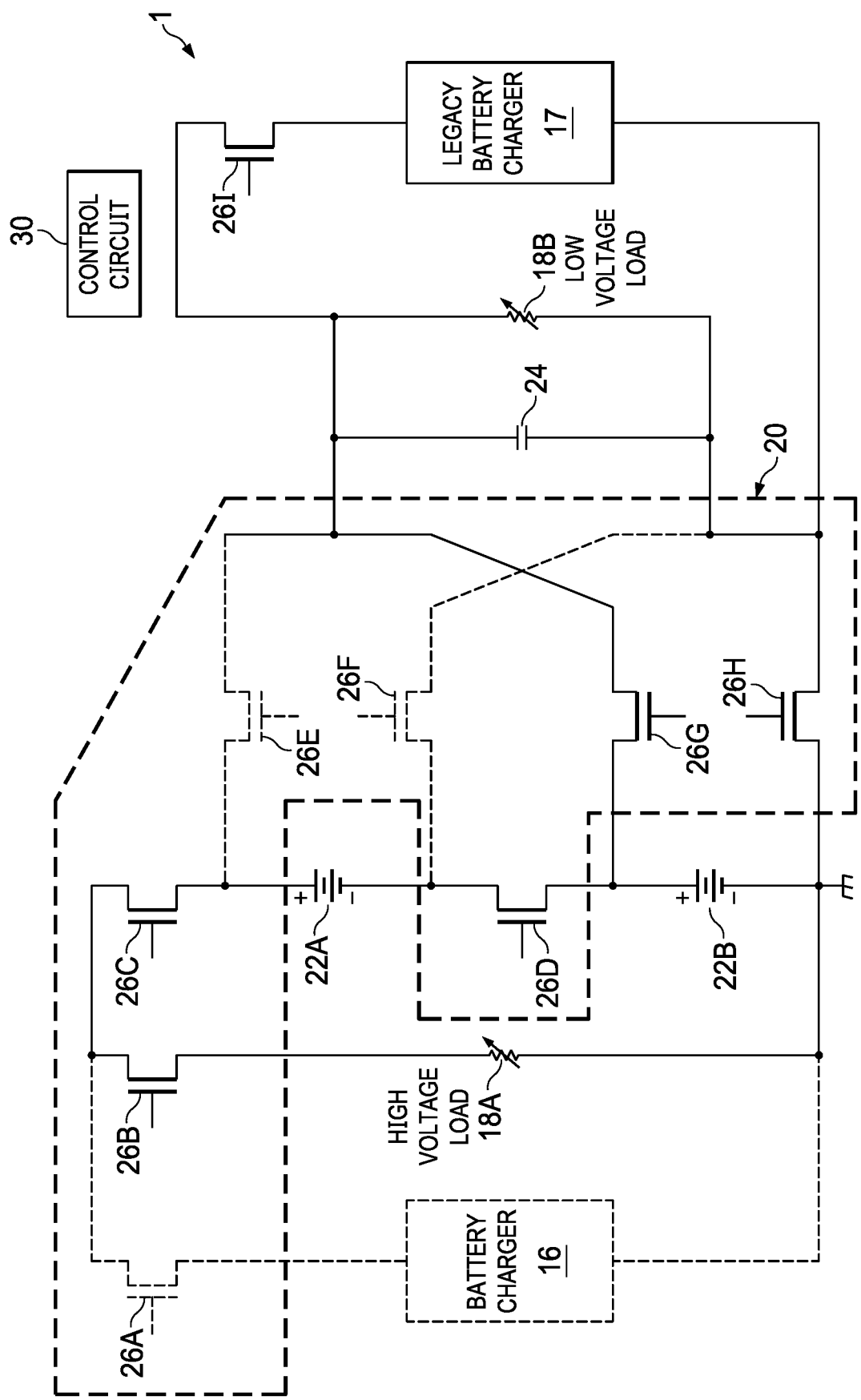

FIGS. 6A and 6B illustrate two alternating phases of operation of a fourth mode of switching network 20 with a legacy battery charger 17 present in parallel with low-voltage load 18B and current being drawn by both high-voltage load 18A and low-voltage load 18B, in accordance with embodiments of the present disclosure. As shown in FIGS. 6A and 6B, switching network 20 may include a ninth switch 26I coupled between legacy battery charger 17 and low-voltage load 18B such that legacy battery charger 17 and low-voltage load 18B are in parallel when switch 26I is activated.

In both phases of the fourth mode, control circuit 30 may cause switches 26B, 26C and 26D to activate, such that high-voltage load 18A is coupled to a series combination of both battery cells 22. Further, control circuit 30 may cause switch 26I to activate, such that legacy battery charger 17 is coupled in parallel with low-voltage load 18B. During a first phase of the fourth mode, as shown in FIG. 6A, control circuit 30 may cause switches 26E and 26F to activate, and switches 26G and 26H to deactivate. Similarly, during a second phase of the fourth mode, as shown in FIG. 6B, control circuit 30 may cause switches 26E and 26F to deactivate, and switches 26G and 26H to activate. Thus, during the fourth mode, low-voltage load 18B may be alternately coupled to battery cell 22A during the first phase and to battery cell 22B in the second phase. In addition, current may flow through switches 26E, 26F, 26G, and 26H in a direction opposite to that of the current flow in the first mode of operation (e.g., FIGS. 3A and 3B) and the second mode of operation (e.g., FIGS. 4A and 4B). Further, the alternative coupling of legacy battery charger 17 between battery cell 22A and 22B may automatically balance battery cells 22, avoiding the need for cell balancing circuitry typically required in traditional architectures.

Figure 7:
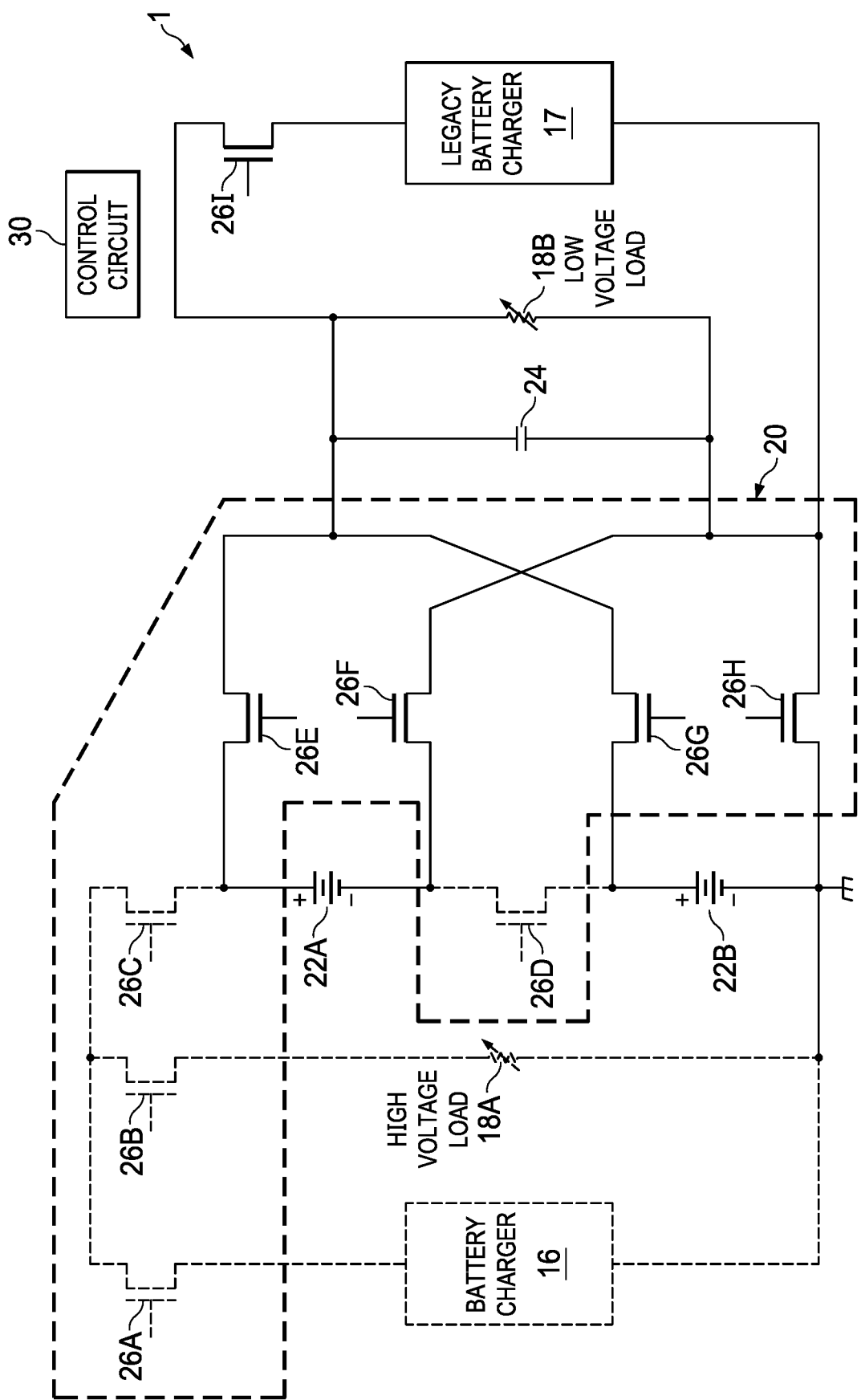
FIG. 7 illustrates operation of a fifth mode of a switching network with a legacy battery charger present and current being drawn by the low-voltage load, but not the high-voltage load, of the portable electronic device of FIGS. 1 and 2, in accordance with embodiments of the present disclosure.

In some instances, high-voltage load 18A may not draw current (e.g., when no audio is played back from portable electronic device 1). In such instances, switching network 20 may operate in a fifth mode of operation. FIG. 7 illustrates a fifth mode of operation of switching network 20 with a legacy battery charger 17 present in parallel with low-voltage load 18B and current being drawn by low-voltage load 18B but not by high-voltage load 18A, in accordance with embodiments of the present disclosure. In the fifth mode, control circuit 30 may cause switches 26A, 26B, 26C and 26D to deactivate, and cause switches 26E, 26F, 26G, 26H, and 26I to activate, thus placing battery cell 22A and battery cell 22B in parallel with one another (and both battery cells 22 in parallel with low-voltage load 18B).

In the systems and methods described above with respect to FIGS. 4A through 7, a two-cell battery management system is disclosed. Such system may include at least a first load (e.g., low-voltage load 18B), and a switching network (e.g. switching network 20 of switches 26) coupling the first load to the two battery cells (e.g., battery cells 22). In a first configuration of the switching network, the switching network may couple the first load to the two battery cells in parallel (e.g., FIG. 5). In a second configuration of the switching network, the switching network may couple the first load in parallel with the first battery cell and isolate the first load from the second battery cell (see FIG. 4A). In a third configuration of the switching network, the switching network may couple the first load in parallel with the second battery cell and isolate the first load from the first battery cell (e.g., FIG. 4B).

In some embodiments, the two-cell battery management system may have a first charger (e.g., legacy battery charger 17), with a switching network (e.g., switching network 20 of switches 26) coupling the first charger to the first load, and a third switching configuration of the switching network coupling the first charger in parallel with the first load. Further, in some embodiments, the two-cell battery management system may further include a second load (e.g., high-voltage load 18A), with the switching network coupling the second load to the battery cells. In a fourth configuration, the switching network may couple the second load in parallel to the series combination of the first battery cell and the second battery cell (e.g., FIGS. 6A and 6B). In these and other embodiments, the two-cell battery management system may have a second charger (e,g, battery charger 16), with the switching network coupling the second charger to the battery cells, with a fifth switching configuration coupling the second charger in parallel with a series combination of the battery cells.

Figure 8A:
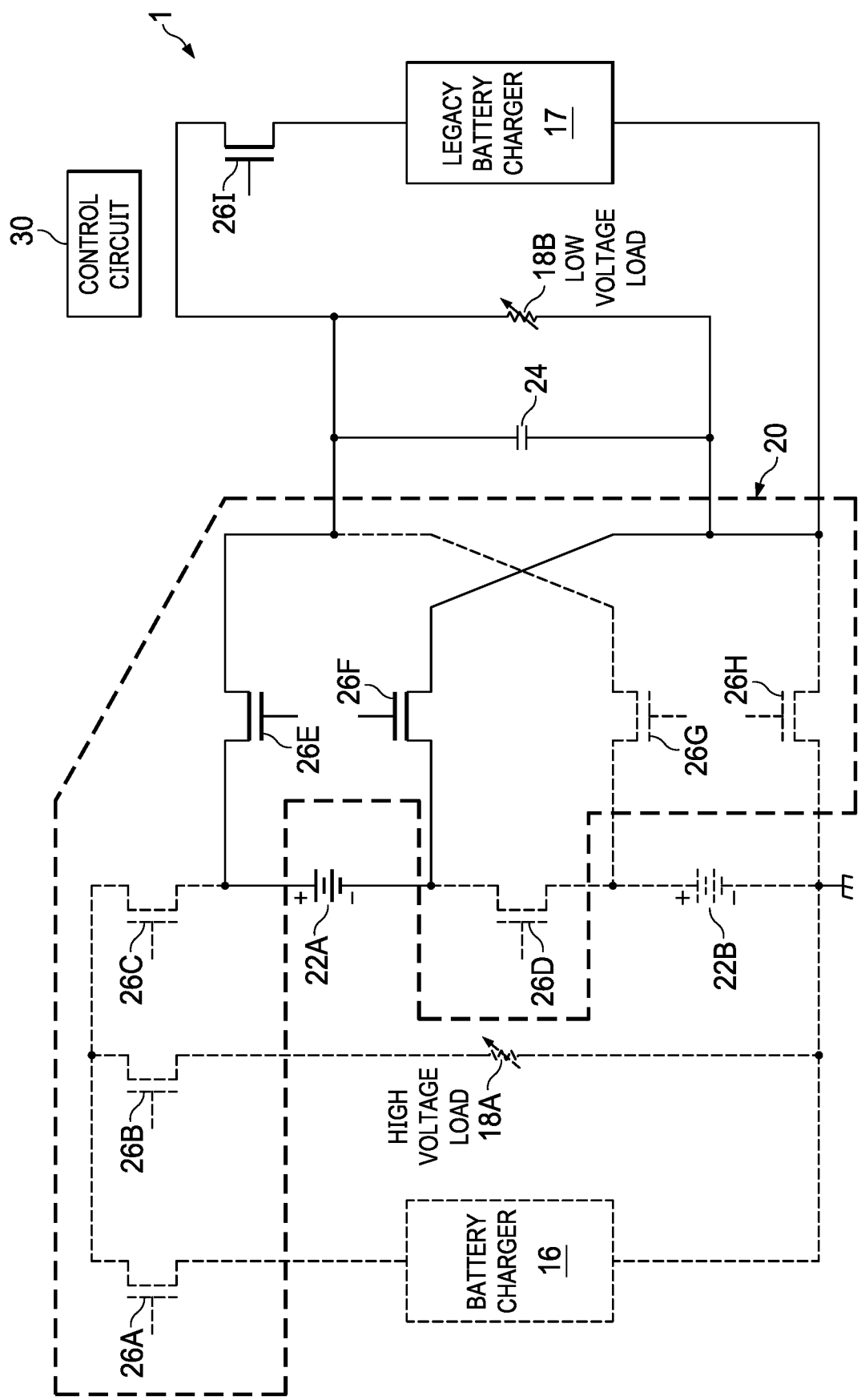
FIGS. 8A and 8B depict two alternating phases of operation of a sixth mode of a switching network with a legacy battery charger present in parallel with the low-voltage load of the portable electronic device of FIGS. 1 and 2, in which the switching network enables pulsed current charging of battery cells, in accordance with embodiments of the present disclosure.
Figure 8B:
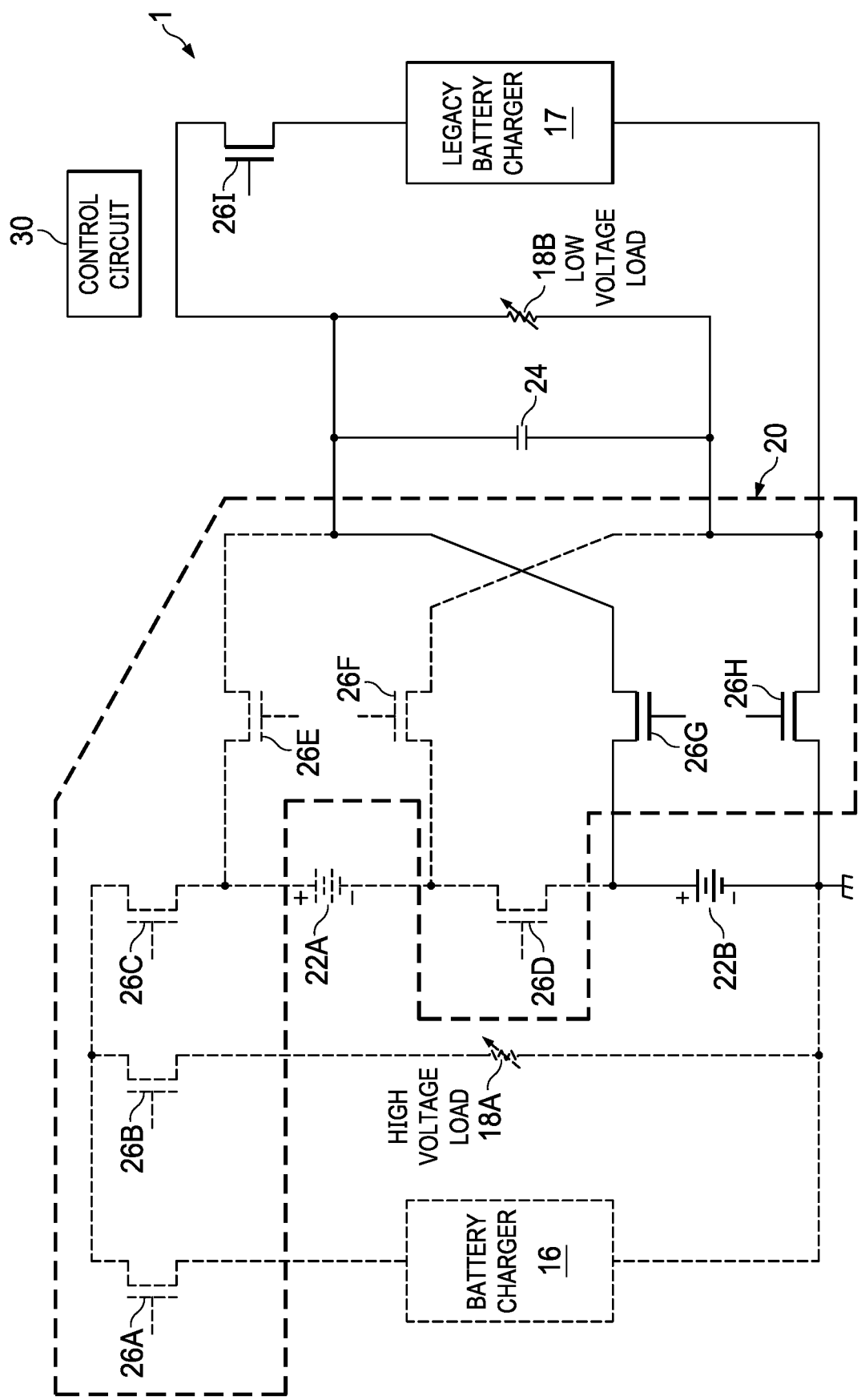

FIGS. 8A and 8B depict two alternating phases of operation of a sixth mode of switching network 20 with legacy battery charger 17 present in parallel with low-voltage load 18B, in which switching network 20 enables pulsed current charging of battery cells 22, in accordance with embodiments of the present disclosure. When high-voltage load 18A does not draw current, in both phases of the sixth mode, control circuit 30 may cause switch 26I to activate, such that legacy battery charger 17 is coupled in parallel with low-voltage load 18B. During a first phase of the sixth mode, as shown in FIG. 8A, control circuit 30 may cause switches 26E and 26F to activate, and switches 26G and 26H to deactivate, such that battery cell 22A charges from legacy battery charger 17. Similarly, during a second phase of the sixth mode, as shown in FIG. 8B, control circuit 30 may cause switches 26E and 26F to deactivate, and switches 26G and 26H to activate, such that battery cell 22B charges from legacy battery charger 17. Thus, during the sixth mode, legacy battery charger 17 may be alternately coupled to battery cell 22A during the first phase and to battery cell 22B in the second phase, thus generating alternating pulses of electrical energy to battery cell 22A and battery cell 22B, thus enabling pulsed current charging which may minimize battery degradation.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A two-cell battery management system comprising:
   a switching network comprising a plurality of switches configured to electrically couple two battery cells to one another and a first load configured to receive electrical energy from the two battery cells; and
   control circuitry configured to dynamically control the switching network among a plurality of switching configurations comprising:

a first switching configuration in which the first load is in parallel with each of the two battery cells, and the two battery cells are in parallel with each other;

a second switching configuration in which the first load is in parallel with a first battery cell of the two battery cells and is electrically isolated from a second battery cell of the two battery cells; and a third switching configuration in which the first load is in parallel with the second battery cell and is electrically isolated from the first battery cell, wherein the control circuitry is configured to alternate between the second switching configuration and the third switching configuration in order to balance utilization of the first battery cell and the second battery cell.

2. The system of claim 1, wherein:
the switching network is further configured to electrically couple the two battery cells and the first load to a first battery charger; and
the plurality of switching configurations further comprises a fourth switching configuration in which the first battery charger is in parallel with the first load.

3. The system of claim 2, wherein:
the switching network is further configured to electrically couple the two battery cells to a second load configured to receive electrical energy from the two battery cells; and
the plurality of switching configurations further comprises a fifth switching configuration in which the second load is in parallel with a series combination of the two battery cells.

4. The system of claim 3, wherein:
the switching network is further configured to electrically couple a second battery charger to the two battery cells; and
the plurality of switching configurations further comprises a sixth switching configuration in which the second charger is in parallel with the series combination of the two battery cells.

5. The system of claim 2, wherein:
the switching network is further configured to electrically couple a second battery charger to the two battery cells; and
the plurality of switching configurations further comprises a fifth switching configuration in which the second charger is in parallel with a series combination of the two battery cells.

6. The system of claim 1, wherein:
the switching network is further configured to electrically couple the two battery cells to a second load configured to receive electrical energy from the two battery cells; and
the plurality of switching configurations further comprises a fourth switching configuration in which the second load is in parallel with a series combination of the two battery cells.

7. The system of claim 1, wherein:
the switching network is further configured to electrically couple a second battery charger to the two battery cells; and
the plurality of switching configurations further comprises:
a fourth switching configuration in which the second battery charger is in parallel with a first battery cell of the two battery cells and is electrically isolated from a second battery cell of the two battery cells; and a fifth switching configuration in which the second battery charger is in parallel with the second battery cell and is electrically isolated from the first battery cell.

8. The system of claim 7, wherein the control circuit is configured to alternate between the fourth switching configuration and the fifth switching configuration in order to balance utilization charging of the first battery cell and the second battery cell from the second battery charger.

9. A method for managing a system having two battery cells, the method comprising:
dynamically controlling, via control circuitry, a switching network comprising a plurality of switches configured to electrically couple the two battery cells to one another and a first load configured to receive electrical energy from the two battery cells, wherein dynamic controlling comprises controlling the switching network among a plurality of switching configurations comprising:
a first switching configuration in which the first load is in parallel with each of the two battery cells, and the two battery cells are in parallel with each other;
a second switching configuration in which the first load is in parallel with a first battery cell of the two battery cells and is electrically isolated from a second battery cell of the two battery cells; and
a third switching configuration in which the first load is in parallel with the second battery cell and is electrically isolated from the first battery cell, wherein the control circuitry is configured to alternate between the second switching configuration and the third switching configuration in order to balance utilization of the first battery cell and the second battery cell.

10. The method of claim 9, wherein:
the switching network is further configured to electrically couple the two battery cells and the first load to a first battery charger; and
the plurality of switching configurations further comprises a fourth switching configuration in which the first battery charger is in parallel with the first load.

11. The method of claim 10, wherein:
the switching network is further configured to electrically couple the two battery cells to a second load configured to receive electrical energy from the two battery cells; and
the plurality of switching configurations further comprises a fifth switching configuration in which the second load is in parallel with a series combination of the two battery cells.

12. The method of claim 11, wherein:
the switching network is further configured to electrically couple a second battery charger to the two battery cells; and
the plurality of switching configurations further comprises a sixth switching configuration in which the second charger is in parallel with the series combination of the two battery cells.

13. The method of claim 10, wherein:
the switching network is further configured to electrically couple a second battery charger to the two battery cells; and
the plurality of switching configurations further comprises a fifth switching configuration in which the second charger is in parallel with a series combination of the two battery cells.

14. The method of claim 9, wherein:
the switching network is further configured to electrically couple the two battery cells to a second load configured to receive electrical energy from the two battery cells; and
the plurality of switching configurations further comprises a fourth switching configuration in which the second load is in parallel with a series combination of the two battery cells.

15. The method of claim 9, wherein:
the switching network is further configured to electrically couple a second battery charger to the two battery cells; and
the plurality of switching configurations further comprises:
a fourth switching configuration in which the second battery charger is in parallel with a first battery cell of the two battery cells and is electrically isolated from a second battery cell of the two battery cells; and
a fifth switching configuration in which the second battery charger is in parallel with the second battery cell and is electrically isolated from the first battery cell.

16. The method of claim 15, further comprising alternating between the fourth switching configuration and the fifth switching configuration in order to balance utilization charging of the first battery cell and the second battery cell from the second battery charger.

17. A portable electronic device comprising:
two battery cells; and
a two-cell battery management system comprising:
a switching network comprising a plurality of switches configured to electrically couple the two battery cells to one another and a first load configured to receive electrical energy from the two battery cells; and
control circuitry configured to dynamically control the switching network among a plurality of switching configurations comprising:
a first switching configuration in which the first load is in parallel with each of the two battery cells, and the two battery cells are in parallel with each other;
a second switching configuration in which the first load is in parallel with a first battery cell of the two battery cells and is electrically isolated from a second battery cell of the two battery cells; and
a third switching configuration in which the first load is in parallel with the second battery cell and is electrically isolated from the first battery cell, wherein the control circuitry is configured to alternate between the second switching configuration and the third switching configuration in order to balance utilization of the first battery cell and the second battery cell.

\* \* \* \* \*